United States Patent Office 3,308,021
Patented Mar. 7, 1967

3,308,021
ALKYLAMINO QUINOXALYL ETHANOLS
Reginald Peter Slatcher, Macclesfield, England, assignor to Imperial Chemical Industries Limited, London, England, a corporation of Great Britain
No Drawing. Filed Sept. 27, 1963, Ser. No. 311,972
Claims priority, application Great Britain, Oct. 23, 1962, 40,174/62
8 Claims. (Cl. 167—65)

This invention relates to heterocyclic compounds and more particularly it relates to new quinoxaline derivatives which possess useful therapeutic properties.

According to the invention we provide quinoxaline derivatives of the formula:

$$\text{[quinoxaline ring A]}-\text{CHOH.CH}_2.\text{NHR}^1$$

wherein $R^1$ stands for an alkyl radical, and ring A may optionally be further substituted, and the salts thereof.

As a suitable value for $R^1$ there may be mentioned, for example, an alkyl radical of not more than 6 carbon atoms, for example the isopropyl, isobutyl, s-butyl, t-butyl or 1-methylbutyl radical.

As a suitable optional additional substituent in ring A there may be mentioned, for example, an alkyl radical, for example an alkyl radical of not more than 6 carbon atoms, for example the methyl radical.

Specific quinoxaline derivatives of the invention are, for example, 2-isopropylamino-1-(2-quinoxalyl)ethanol, and 2-isopropylamino-1-(3-methyl-2-quinoxalyl)ethanol, and the salts thereof.

As suitable salts of the said quinoxaline derivatives there may be mentioned acid-addition salts, for example salts derived from inorganic acids, for example hydrochlorides, hydrobromides, phosphates or sulphates, or salts derived from organic acids, for example oxalates, lactates, tartrates, acetates, salicylates or citrates.

According to a further feature of the invention we provide a process for the manufacture of the said quinoxaline derivatives which comprises the interaction of an acyl derivative of the formula:

$$\text{[quinoxaline ring A]}-\text{R}$$

wherein A has the meaning stated above, and R stands for the $-\text{C(OCOR}^2)=\text{CH.OCOR}^2$ or $-\text{CO.CH}_2.\text{OCOR}^2$ group, wherein $R^2$ stands for an alkyl radical of not more than 6 carbon atoms, for example the methyl radical, or of a mixture consisting of an acyl derivative of the above formula, wherein R stands for the $$-\text{C(OCOR}^2)=\text{CH.OCOR}^2$$

group, and an acyl derivative of the above formula wherein R stands for the $-\text{CO.CH}_2.\text{OCOR}^2$ group wherein $R^2$ has the meaning stated above, with an amine of the formula $\text{NH}_2\text{R}^1$, wherein $R^1$ has the above meaning, under reducing conditions.

Suitable reducing conditions are provided by the presence of an alkali metal borohydride, for example sodium borohydride, in an inert diluent or solvent, for example methanol or ethanol. It is to be understood that the above-mentioned process can be carried out by adding the amine and the reducing agent at substantially the same time to the acyl derivative, or by adding the amine to the acyl derivative and adding the reducing agent subsequently.

The said acyl derivatives may be obtained by the interaction of a compound of the formula:

$$\text{[quinoxaline ring A]}-(\text{CHOH})_3.\text{CH}_2\text{OH}$$

wherein A has the meaning stated above, with sodium methoxide in pyridine, followed by reaction of the product, in pyridine, with an acid anhydride of the formula $(\text{R}^2\text{CO})_2\text{O}$, wherein $R^2$ has the meaning stated above.

According to a further feature of the invention we provide a process for the manufacture of the said quinoxaline derivatives which comprises the reduction of an amino-ketone of the formula:

$$\text{[quinoxaline ring A]}-\text{CO.CH}_2.\text{NHR}^1$$

wherein $R^1$ and A have the meanings stated above.

The reduction may be carried out, for example, by the use of sodium borohydride as reducing agent in the presence of a diluent or solvent, for example methanol. It is to be understood that the amino-ketone may be generated in situ and submitted to the reduction process forthwith. Thus, the amino-ketone may be generated in situ by the interaction of the corresponding haloacetylquinoxaline and the corresponding amine of the formula $\text{NH}_2\text{R}^1$, wherein $R^1$ has the meaning stated above.

The quinoxaline derivatives of the invention possess $\beta$-adrenergic blocking activity and they are therefore useful in the treatment or prophylaxis of coronary artery disease.

According to a further feature of the invention, therefore, we provide pharmaceutical compositions comprising as active ingredient at least one of the said quinoxaline derivatives, or a salt thereof, in admixture with an inert pharmaceutically-acceptable diluent or carrier.

The pharmaceutical compositions may be in the form of tablets, capsules, aqueous or oily solutions, aqueous or oily suspensions, emulsions, injectable aqueous or oily solutions or suspensions, or dispersible powders.

Suitable tablets may be formulated by admixture of the active ingredient(s) with known pharmaceutical excipients, for example inert diluents, for example calcium carbonate, calcium phosphate or lactose, disintegrating agents, for example maize starch or alginic acid, binding agents, for example starch, gelatin or acacia mucilage, and lubricating agents, for example magnesium stearate, stearic acid or talc. Such tablets may optionally be coated by known techniques in order to delay disintegration in the stomach and thus provide a sustained action over an extended period.

The aqueous suspensions, emulsions, oily solutions and suspensions of the invention generally contain a sweetening agent, for example glycerol, dextrose or sucrose, and a flavouring agent, for example vanillin or orange extract, in order to provide a palatable product. The aqueous suspensions of the invention may also contain suitable suspending or thickening agents, for example sodium carboxymethylcellulose, wetting agents, for example condensation products of fatty alcohols with ethylene oxide, and suitable preservatives, for example methyl or propyl p-hydroxybenzoate.

The emulsion compositions of the invention may contain the active ingredient(s) dissolved in a suitable oil of vegetable or animal origin, for example arachis oil or cod liver oil, and may also contain sweetening agents and flavouring agents which may with advantage be essential oils. The said emulsions may also contain emulsifying agents and dispersing agents, for example soya bean lecithin, polyoxyethylene sorbitan monoleate, gum acacia, gum tragacanth or casein, and preservatives, for example methyl or propyl p-hydroxybenzoate, and anti-oxidants, for example propyl gallate.

The oily solutions of the invention likewise contain the active ingredient(s) in solution in a suitable oil of vegetable or animal origin, and may optionally contain flavouring agents to mask the taste and improve oral acceptability. Such oily solutions may advantageously be filled into soft gelatin capsules. The oily solutions may also contain sweetening agents, for example icing sugar.

Oral compositions in the form of gelatin capsules may consist of capsules containing active ingredient(s) only or the capsules may contain the active ingredient(s) in admixture with inert diluents, for example lactose or sorbitol.

The sterile injectable aqueous suspensions of the invention may contain a suspending or thickening agent, for example sodium carboxymethylcellulose, and a wetting or dispersing agent, for example a phenol-polyethylene oxide condensate, for example the condensation product of octylcresol with about 8–10 molecular proportions of ethylene oxide. The injectable oily solutions of the invention may be prepared from a non-toxic injectable fat or oil, for example arachis oil or ethyl oleate, and they may additionally contain gelling agents, for example aluminum stearate, to delay absorption within the body. These aqueous and oily injectable preparations may contain preservatives, for example methyl or n-propyl p-hydroxybenzoate or chlorobutanol.

The invention is illustrated but not limited by the following examples in which the parts are by weight:

*Example 1*

10 parts of isopropylamine are added to a stirred solution of 0.5 part of 2-acetoxyacetyl-quinoxaline in 30 parts of ethanol at 0° C. during 10 minutes. The solution is stirred at 0° C. for a further 5 minutes, and a solution of 1 part of sodium borohydride in 10 parts of ethanol is then added. The solution is stirred at 0° C. for 1 hour, and 15 parts of glacial acetic acid are then slowly added. 100 parts of water containing 5 parts of 6 N-hydrochloric acid are added, and the ethanol is evaporated under reduced pressure. The aqueous solution is washed three times with 30 parts of ether, and is then made alkaline with 20 parts of 6N-sodium hydroxide solution. The solution is extracted three times with 50 parts of ether, and the combined ethereal extracts are washed with water, dried, and evaporated to dryness. The residual syrup is dissolved in hot petroleum ether (B.P. 60–80° C.), the hot solution is filtered, and the filtrate is allowed to cool. The mixture is filtered and the solid residue is crystallised from petroleum ether (B.P. 60–80° C.). There is thus obtained 2-isopropylamino-1-(2-quinoxalyl)ethanol, M.P. 98–99° C.

The 2-acetoxyacetylquinoxaline used as starting material may be obtained as follows:

A suspension of 15 parts of 2-(D-arabinotetrahydroxybutyl)quinoxaline in 40 parts of dry pyridine is added to a solution of 3 parts of sodium in 40 parts of methanol, and the mixture is heated under reflux during 2 hours. The mixture is cooled to 0° C., kept at this temperature for 4 hours, and then filtered. The solid residue is dissolved in 100 parts of water, and the solution is acidified with 20 parts of 6N-sulphuric acid. The mixture is filtered, affording a red solid residue. 18 parts of acetic anhydride are added to a solution of 5.9 parts of the above red solid in 18 parts of dry pyridine, and the solution is kept at ambient temperature for 18 hours. The solution is poured into 200 parts of water, and the precipitated tar and the aqueous solution are extracted 5 times with 100 parts of ether. The combined ethereal extracts are washed successively with 100 parts of N-hydrochloric acid, 100 parts of saturated sodium bicarbonate solution, and 100 parts of water, and then dried and evaporated to dryness. The residual oil is extracted with 40 parts of boiling petroleum ether (B.P. 60–80° C.), charcoal is added, and the mixture is heated under reflux for 5 minutes, and then filtered. The filtrate is cooled, the mixture is filtered (the filtrate is retained; filtrate A below) and the solid residue is crystallised from petroleum ether (B.P. 60–80° C.). There is thus obtained 2-($\alpha,\beta$-diacetoxyvinyl)quinoxaline, M.P. 117° C.

The filtrate A is evaporated to one quarter of its original volume, and the residual solution is cooled. The mixture is filtered and the solid residue is crystallised from petroleum ether (B.P. 60–80° C.). There is thus obtained 2-acetoxyacetylquinoxaline, M.P. 113–114° C.

*Example 2*

A solution of 2 parts of isopropylamine in 5 parts of methanol is added to a stirred solution of 0.18 part of 2-($\alpha,\beta$-diacetoxyvinyl)quinoxaline in 10 parts of methanol during 5 minutes at 0° C. The solution is stirred at 0° C. for a further 10 minutes, and a solution of 1 part of sodium borohydride in 10 parts of methanol is then added during 10 minutes. The solution is stirred at 0° C. for 1 hour and then at ambient temperature for 1 hour. A solution of 5 parts of glacial acetic acid in 5 parts of methanol is slowly added at 0° C. to the stirred solution, and 100 parts of water containing 5 parts of 6N-hydrochloric acid are then added. The methanol is evaporated under reduced pressure, and the product is then isolated by the procedure described in Example 1. There is thus obtained 2-isopropylamino-1-(2-quinoxalyl)ethanol, M.P. 98–99° C.

The 2-($\alpha,\beta$-diacetoxyvinyl)quinoxaline used as starting material may be obtained as described in Example 1.

*Example 3*

2.7 parts of 2-bromoacetyl-3-methylquinoxaline are dissolved in 80 parts of methanol. The solution is cooled to 0–5° C., and 10.5 parts of isopropylamine are added. 1 part of sodium borohydride is then added during 30 minutes at 0–5° C. The reaction mixture is then stirred at 0–5° C. for 1 hour and then at ambient temperature for 1½ hours. 80 parts of water are added and the solution is adjusted to pH 5 by the addition of acetic acid. Methanol is removed by distillation in vacuo, and the residual aqueous solution is washed 5 times with 20 parts of ether. The aqueous solution is then made strongly alkaline by the addition of sodium hydroxide solution, and the mixture is extracted 5 times with 20 parts of ether. The combined ethereal extract is dried over anhydrous sodium sulphate, and the solvent is removed by evaporation. The residual oil is extracted with hot petroleum ether (B.P. 60–80° C.), and the petroleum ether extract is evaporated to small volume and then cooled. The resulting mixture is filtered and the solid residue is washed with petroleum (B.P. 40–60° C.). The solid is crystallised from ethyl acetate, and there is thus obtained 2-isopropylamino-1-(3-methyl-2-quinoxalyl)ethanol, M.P. 89–90° C.

The 2-bromoacetyl-3-methylquinoxaline used as starting material may be obtained as follows:

3 parts of 2-acetyl-3-methylquinoxaline are dissolved in 27 parts of hydrobromic acid and the solution is warmed to 60–65° C. A solution of 3.2 parts of bromine in 18 parts of hydrobromic acid is added during 15 minutes at 65° C. The mixture is stirred for 10 minutes at 65° C., and is then cooled to 0° C. The mixture is filtered, and the solid residue is washed with water and then dissolved in 30 parts of 80% aqueous acetic acid. The solution is heated to 40° C., and a warm solution of 10 parts of sodium acetate in 20 parts of water is added. The mixture is then immediately cooled to 15–20° C. and filtered. The solid residue is washed with water, dried and crystallised from aqueous methanol. There is thus obtained 2 - bromoacetyl - 3 - methylquinoxaline, M.P. 107° C.

Example 4

A mixture of 50 parts of 2-isopropylamino-1-(2-quinoxalyl) ethanol, 125 parts of maize starch, 270 parts of calcium phosphate and 1 part of magnesium stearate is compressed, and the compressed material is then broken down into granules by passage through a 16-mesh screen. The resultant granules are compressed into tablets, and there are thus obtained tablets that are suitable for oral use for therapeutic purposes.

The 2-isopropylamino-1-(2-quinoxalyl)ethanol may be replaced by 2-isopropylamino-1-(3-methyl-2-quinoxalyl) ethanol and in a similar manner there are obtained tablets that are suitable for oral use for therapeutic purposes.

Example 5

A mixture of 50 parts of 2-isopropylamino-1-(2-quinoxalyl)ethanol and 150 parts of maize starch is filled into hard gelatine capsules. The composition so obtained is suitable for oral use for therapeutic purposes.

What we claim is:

1. A quinoxaline derivative selected from compounds of the formula:

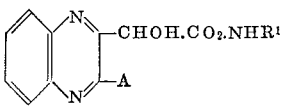

wherein $R^1$ is alkyl of up to 6 carbon atoms and A is selected from hydrogen and alkyl of up to 6 carbon atoms, and the pharmaceutically acceptable acid-addition salts thereof.

2. A compound selected from the group consisting of 2-isopropylamino-1-(2-quinoxalyl)ethanol and the pharmaceutically-acceptable acid addition salts thereof.

3. A compound selected from the group consisting of 2-isopropylamino-1-(3-methyl-2-quinoxalyl)ethanol and the pharmaceutically-acceptable acid-addition salts thereof.

4. A process for the manufacture of the quinoxaline derivatives claimed in claim 1 which comprises reducing at least one acyl derivative selected from compounds of the formulae:

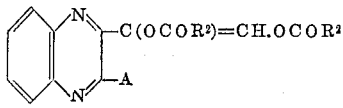

and

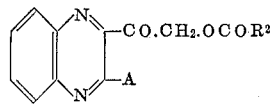

wherein A is selected from the group consisting of hydrogen and alkyl of up to six carbon atoms, and wherein $R^2$ is alkyl of up to six carbon atoms, in the presence of an amine of the formula $NH_2R^1$, wherein $R^1$ is an alkyl of up to six carbon atoms, under reducing conditions.

5. The process of claim 4 wherein said borohydride is sodium borohydride and said vehicle is methanol or ethanol.

6. A process as claimed in claim 4 wherein the amine and the reducing agent are added at substantially the same time to the acyl derivative.

7. A process as claimed in claim 4 wherein the amine is added to the acyl derivative and the reducing agent is added subsequently.

8. As a pharmaceutical composition of matter, a quinoxaline derivative according to claim 1 in admixture with a major amount of an inert pharmaceutically-acceptable carrier.

No references cited.

NICHOLAS S. RIZZO, *Primary Examiner.*